(12) United States Patent
Nakayama

(10) Patent No.: US 9,287,672 B2
(45) Date of Patent: Mar. 15, 2016

(54) BATTERY WIRING MODULE INCLUDING A WIRE ROUTING SPACE DISPOSED ON A LID COVERING A BUS BAR

(75) Inventor: Osamu Nakayama, Yokkaichi (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 240 days.

(21) Appl. No.: 14/114,867

(22) PCT Filed: May 25, 2012

(86) PCT No.: PCT/JP2012/063458
§ 371 (c)(1),
(2), (4) Date: Oct. 30, 2013

(87) PCT Pub. No.: WO2012/169373
PCT Pub. Date: Dec. 13, 2012

(65) Prior Publication Data
US 2014/0065885 A1    Mar. 6, 2014

(30) Foreign Application Priority Data
Jun. 9, 2011 (JP) ................. 2011-129310

(51) Int. Cl.
| H01M 2/20 | (2006.01) |
| --- | --- |
| H01M 2/30 | (2006.01) |
| H01M 2/34 | (2006.01) |
| H01M 10/48 | (2006.01) |
| H01R 25/16 | (2006.01) |
| H01R 25/00 | (2006.01) |
| H01M 2/22 | (2006.01) |
| H01M 2/10 | (2006.01) |

(52) U.S. Cl.
CPC ............ *H01R 25/006* (2013.01); *H01M 2/206* (2013.01); *H01M 2/22* (2013.01); *H01M 10/482* (2013.01); *H01M 2/1077* (2013.01); *H01M 2220/20* (2013.01)

(58) Field of Classification Search
CPC ..... H01M 2/206; H01M 10/482; H01M 2/22; H01R 25/006
USPC ........................... 429/158, 159, 160; 439/627
See application file for complete search history.

(56) References Cited

U.S. PATENT DOCUMENTS

| 2011/0064987 A1 | 3/2011 | Ogasawara et al. | |
| 2012/0295485 A1* | 11/2012 | Ikeda ................. | H01M 2/1077 439/626 |

FOREIGN PATENT DOCUMENTS

| JP | A-2008-243412 | 10/2008 |
| JP | A-2011-008955 | 1/2011 |
| JP | A-2011-065863 | 3/2011 |

*Primary Examiner* — Sean P Cullen
(74) *Attorney, Agent, or Firm* — Oliff PLC

(57) ABSTRACT

A battery wiring module is configured for attachment to an electric cell group constituted by an array of a plurality of electric cells, each having positive and negative electrode terminals. The battery wiring module includes a bus bar connectable to the electrode terminals, a detection wire for detecting a state of the electric cell group, a resin protector for holding the bus bar, a lid portion that covers the bus bar and is made of an insulating material, and at least one wall portion disposed on a face of the lid portion opposite to the bus bar in a direction intersecting the lid portion. The at least wall portion forms a routing space in which the detection wire is routed.

6 Claims, 11 Drawing Sheets

BATTERY WIRING MODULE INCLUDING A WIRE ROUTING SPACE DISPOSED ON A LID COVERING A BUS BAR

BACKGROUND

Some disclosed embodiments relate to a battery wiring module for attachment to an electric cell group.

A related art power battery module for mounting in a vehicle, such as in an electric automobile or a hybrid vehicle, includes a number of electric cells that are connected in series via bus bars. In this kind of battery module, detection wires for detecting the state of an electric cell group, such as voltage detection wires for measuring a terminal voltage of each electric cell, need to be connected to electrode terminals of the electric cells.

This type of related art battery module is assembled by attaching a battery wiring module including bus bars and detection wires to an electric cell group constituted by an array of a plurality of electric cells. For example, JP 2011-8955A discloses a plurality of bus bars that are held at predetermined positions on a resin protector, and a plurality of detection wires are provided in accordance with the number of electric cells and collectively accommodated in a wire accommodating groove provided in the resin protector.

SUMMARY

If it is attempted in a battery wiring module to route detection wires in a superposed manner on the side of one face of bus bars, it is conceivable to arrange a lid portion for insulation on the side of this face of the bus bars and route the detection wires on the side of the lid portion opposite to the bus bar. At this time, bundling the detection wires using a bundling band or the like is conceivable as a means for collectively positioning, to some extent, the detection wires disposed along the lid portion.

However, in accordance with such a structure, it is necessary to attach a fixing component (such as the bundling band to the detection wires), resulting in an increase in effort required to assemble the battery wiring module and a possibility of degrading workability.

Some embodiments address the above issue, and thereby provide a battery wiring module capable of routing detection wires in a superposed manner on the side of one face of bus bars, without degrading workability in an assembly work.

Some embodiments are therefore directed to a battery wiring module for attachment to an electric cell group constituted by an array of a plurality of electric cells each having positive and negative electrode terminals. The battery wiring module includes: a bus bar to be connected to the electrode terminals; a detection wire for detecting a state of the electric cell group; a resin protector that holds the bus bar; a lid portion that covers the bus bar and is made of an insulating material; and at least one wall portion disposed on a face of the lid portion opposite to the bus bar in a direction intersecting the lid portion. The at least one wall portion forms a routing space in which the detection wire is routed.

With this configuration, the detection wire can be collectively positioned at the lid portion without attaching a fixing member to the detection wire, and accordingly, the detection wire can be routed on the side of one face of the bus bar in a superposed manner, without degrading workability in an assembly work.

Furthermore, the wall portion may be a pair of wall portions provided on both sides of the detection wire, the pair of wall portions may extend continuously in a routing direction of the detection wire, and a wire covering portion for covering the detection wire routed in the routing space so as to bridge the pair of wall portions may be provided. With this configuration, it is possible to restrict protrusion of the detection wire from the routing space to the outside, and impede or prevent the detection wire from contacting the outside.

Furthermore, the wire covering portion may be integrated with the lid portion, and may be pivotable between a closed state where the wire covering portion closes the routing space and an opened state in which the wire covering portion releases the routing space. With this configuration, it is possible to fix the detection wire to the lid portion and protect the detection wire with an easy work of only routing the detection wire to the routing space with the wire covering portion being in an opened state, and pivoting the wire covering portion into a closed state.

Furthermore, the wire covering portion and the wall portion may be each provided with a locking structure for stopping each other in an engaged manner with pivoting movement of the wire covering portion from the opened state to the closed state. With this configuration, the wire covering portion and the wall portion can be locked with an easy work of only pivoting the wire covering portion from the opened state into the closed state.

Thus, some embodiments provide a battery wiring module capable of routing the detection wire on the side of one face of the bus bar in a superposed manner, without degrading workability in an assembly work.

DETAILED DESCRIPTION OF THE EMBODIMENTS

Figure 1:
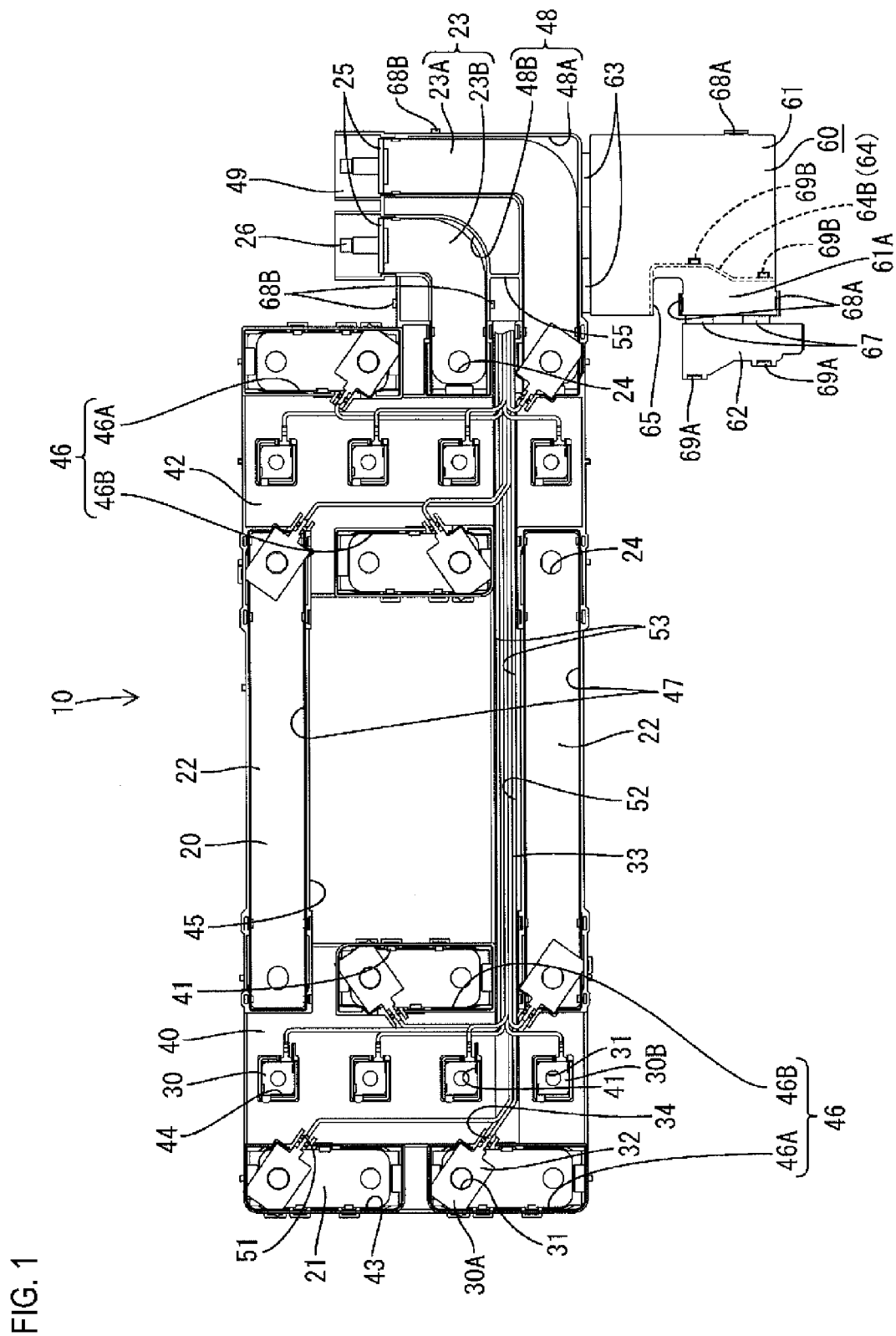
FIG. 1 is a plan view of a battery wiring module according to the present embodiment, and is a plan view showing a releasing state of a lid portion.
Figure 2:
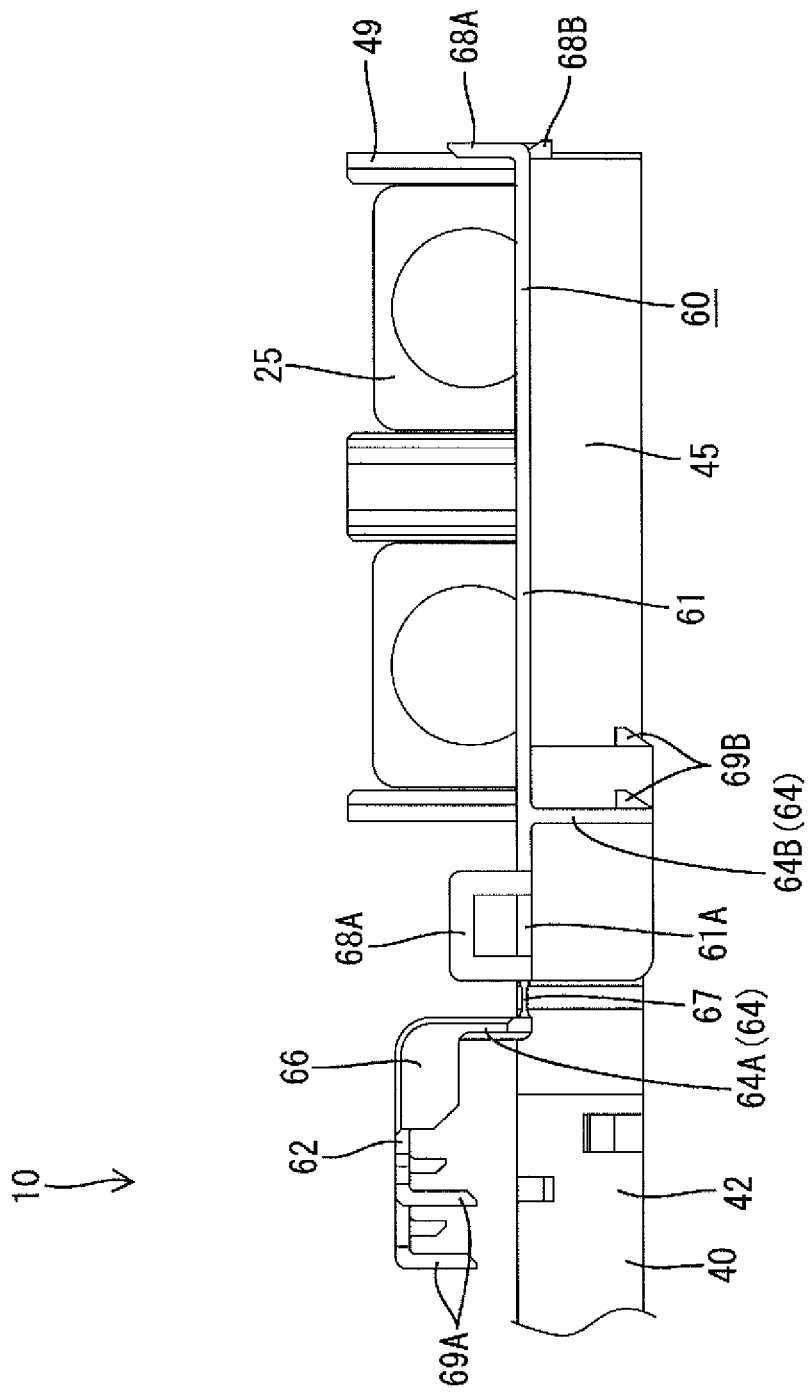
FIG. 2 is a partial enlarged front view of the battery wiring module showing the releasing state of the lid portion.
Figure 3:
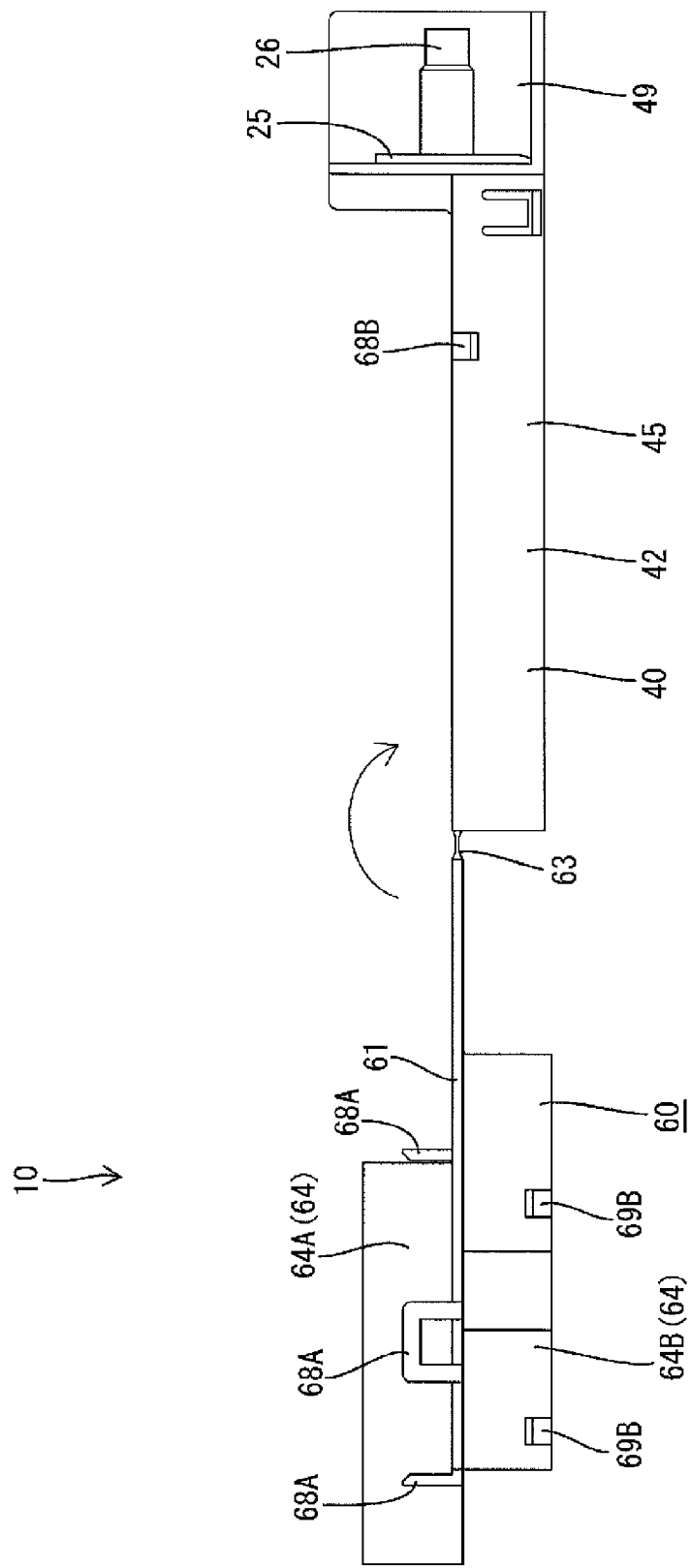
FIG. 3 is a partial enlarged side view of the battery wiring module showing the releasing state of the lid portion.

One embodiment is described in detail below with reference to FIGS. 1 to 12. A battery wiring module 10 according to the present embodiment is attached to an electric cell group 13 constituted by an array of a plurality of (in the present embodiment, eight) electric cells 12 each having positive and negative electrode terminals 11, and electrically connects the positive electrode terminals 11 and the negative electrode terminals 11 in different electric cells 12 to each other. A battery module configured by attaching the battery wiring module 10 to the electric cell group 13 is used as a driving source of an electric automobile, a hybrid vehicle, or the like, for example.

The electric cells 12 are lithium-ion cells, nickel-hydrogen cells, or other kinds of secondary cells, and each have a body portion 14 in which a cell element (not shown) is accommodated, the positive and negative electrode terminals 11, and a terminal 15 for voltage detection. Each body portion 14 has a flat and square box shape, and the positive and negative electrode terminals 11 and the terminal 15 for voltage detection are provided on the upper face of the body portion 14.

Figure 12:
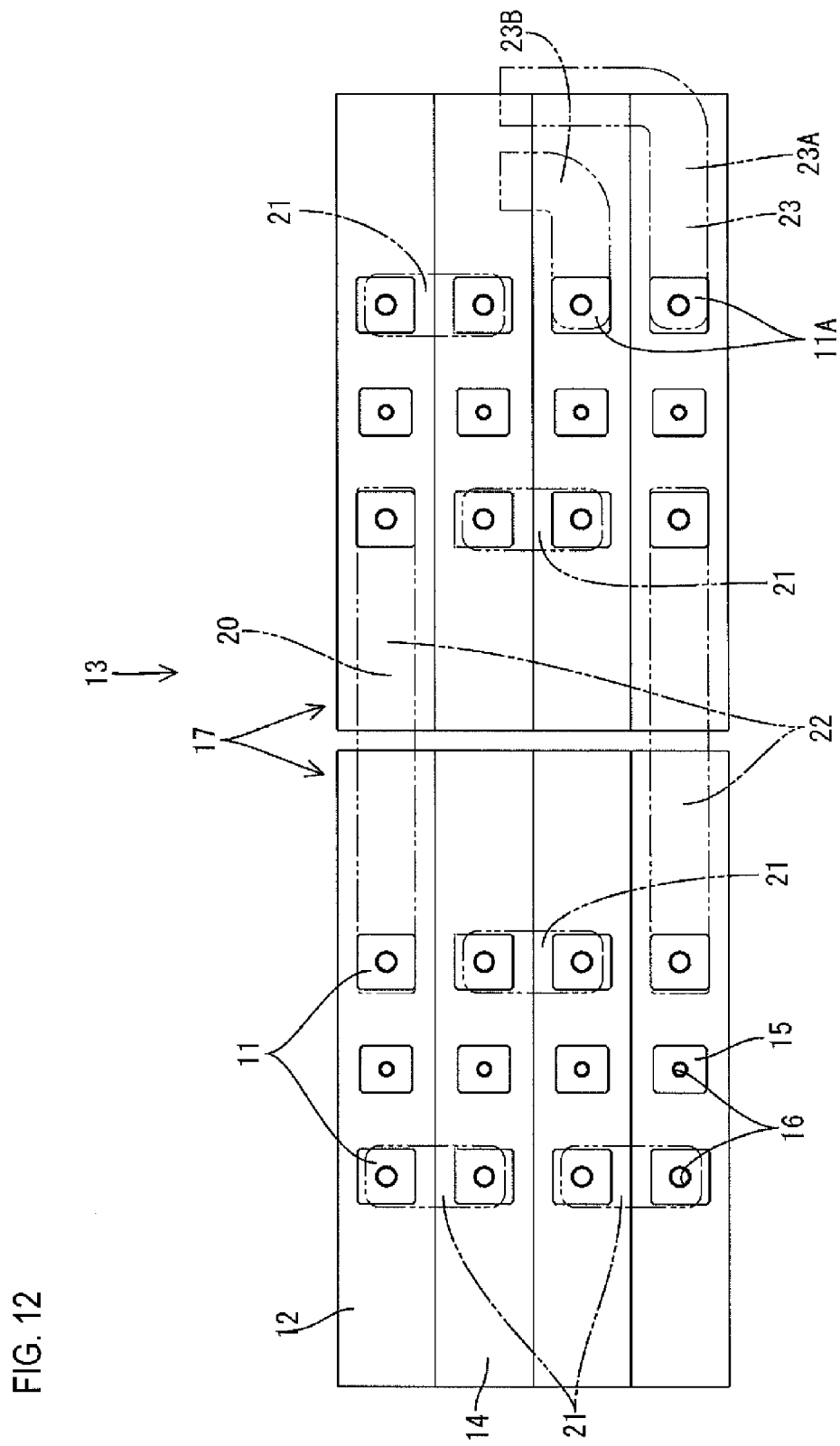
FIG. 12 is a schematic view showing an arrangement of bus bars with respect to an electric cell group.

The electrode terminals 11 and the terminal 15 for voltage detection are made of metal (copper, copper alloy, aluminum, aluminum alloy, etc.), formed by a known technique such as machining, casting, or forging, and each have a nut shape having an internal screw hole 16 formed at a substantially central position (see FIG. 12). The terminal 15 for voltage detection is disposed at a substantially intermediate position between the positive and negative electrode terminals 11, and a voltage at a substantially intermediate position between the positive and negative electrode terminals 11 of each electric cell 12 can be detected using this terminal 15 for voltage detection. The positive and negative electrode terminals 11 located at both ends of the electric cell group 13 with the electric cells connected in series constitute output terminals 11A for outputting electricity to the outside.

As shown in FIG. 12, a plurality of (in the present embodiment, four) the electric cells 12 are arranged in one direction (vertical direction) such that the electrode terminals 11 of different polarities adjoin each other, and a plurality of one (in the present embodiment, two) electric cell columns 17 including the electric cells arranged in one direction are adjacently arranged in the other direction (a direction orthogonal to the one direction; horizontal direction). Note that the electric cell group 13 is held together by a holding member (not shown).

The battery wiring module 10 includes a plurality of bus bars 20 connected to the electrode terminals 11. The bus bars 20 are formed by pressing plate materials made of metal, such as copper, copper alloy, stainless steel (SUS), or aluminum, into a predetermined shape. The surface of the bus bars 20 may be plated by metal such as tin or nickel.

The bus bars 20 include first bus bars 21 for connecting the electrode terminals 11 of different polarities of the electric cells 12 arranged in the vertical direction, second bus bars 22 for connecting the electrode terminals 11 disposed at opposing ends of the electric cell columns 17 connected in series by the first bus bars 21, and output bus bars 23 for connecting the output terminals 11A to external connection terminals 26.

The first bus bars 21 and the second bus bars 22 each have an overall substantially rectangular shape, the dimension in their longitudinal direction is set to a dimension according to the distance between adjoining electrode terminals 11, and the second bus bars 22 are longer than the first bus bars 21. The first bus bars 21 and the second bus bars 22 each have a pair of through holes 24, into which shaft portions of bolts (not shown) screwed into the internal screw holes 16 of the electrode terminals 11 can be inserted. The through holes 24 are formed in a penetrating manner by piercing the bus bars 20, 20 in a plate-thickness direction.

The output bus bars 23 each have an overall substantially L-shaped form, and have, on one end thereof, the through hole 24 into which a shaft portion of a bolt screwed into the output terminal 11A can be inserted, and, on the other end thereof, an external connection portion 25 connected to the outside. The external connection portion 25 is bent in a substantially right-angle direction relative to a plate face of the other part of the output bus bar 23, and an external connection terminal 26 is installed so as to protrude substantially vertically at the center of the external connection portion 25. The external connection terminal 26 forms a bolt shape threaded on its outer-circumferential face, and is fixed to the external connection portion 25 by being driven into a through hole (not shown) formed in the external connection portion 25 or being welded to the external connection portion 25.

The output bus bars 23 include a first output bus bar 23A connected to the output terminal 11A disposed at a corner of the electric cell group 13, and a second output bus bar 23B connected to the output terminal 11A arranged so as to adjoin the output terminal 11A at the corner on the inside thereof. The first output bus bar 23A is longer than the second output bus bar 23B. The external connection portion 25 of the first output bus bar 23A and the external connection portion 25 of the second output bus bar 23B are arranged next to each other, with their positions in the vertical direction being aligned with each other.

The battery wiring module 10 includes voltage detection terminals (detection terminals) 30 for detecting voltage of the electric cells 12. The voltage detection terminals 30 are formed by pressing plate materials made of metal, such as copper, copper alloy, stainless steel, or aluminum, into a predetermined shape. The voltage detection terminals 30 each have a terminal body portion 32 having a through hole 31 into which a shaft portion of a bolt screwed into the internal screw hole 16 of the electrode terminal 11 or the terminal 15 for voltage detection can be inserted, and a wire crimping portion 34 at which a terminal portion of a voltage detection wire (detection wire) 33 is crimped. The surface of the voltage detection terminal 30 may be plated with metal such as tin or nickel.

The through hole 31 is formed substantially at the center of the terminal body portion 32, and the voltage detection terminal 30 is connected by bolting, as a result of its through hole 31 being disposed at a position aligned with the internal screw hole 16 of the electrode terminal 11 or the terminal 15 for voltage detection. The voltage detection terminals 30 include first voltage detection terminals 30A that are fastened to the electrode terminals 11 together with the bus bars 20 and second voltage detection terminals 30B independently connected to the terminals 15 for voltage detection. The first voltage detection terminals 30A each have a terminal body portion 32 that is larger than that of the second voltage detection terminals 30B.

The battery wiring module 10 includes a resin protector 40 made of synthetic resin for holding the bus bars 20. The resin protector 40 is formed by coupling a plurality of coupling units in a state where they are allowed to move relatively to each other to some extent.

The resin protector 40 has a protector body portion 42 for holding the bus bars 20 and the voltage detection terminals 30 and a stacking arrangement portion 60 for arranging the voltage detection wires 33 in a stacked manner on the side of one face (upper side) of the bus bars 20. The stacking arrangement portion 60 is described in detail below.

The protector body portion 42 has bus bar accommodating portions 43 for accommodating and holding the bus bars 20, and detection terminal accommodating portions 44 for accommodating and holding the terminal body portions 32 of the second voltage detection terminals 30B. The bus bar accommodating portions 43 and the detection terminal accommodating portions 44 each have a substantially rectangular shape enclosed by a circumferential wall 45, and are open in a vertical direction. The circumferential walls 45 of the bus bar accommodating portions 43 and the detection terminal accommodating portions 44 stand up to a position higher than the head of bolts screwed to the electrode terminals 11 or the terminals 15 for voltage detection, thus preventing a tool or the like from coming in contact with the bolt head and causing a short circuit. The circumferential walls 45 of the bus bar accommodating portions 43 and the detection terminal accommodating portion 44 are each provided with an insertion portion 51 for causing the wire crimping portion 34 of the voltage detection terminal 30 to protrude outward from the bus bar accommodating portion 43 or the detection terminal accommodating portion 44.

The bus bar accommodating portions 43 and the detection terminal accommodating portions 44 are each provided with a support portion (not shown) for supporting the lower face side of the bus bar 20 or the second voltage detection terminal 30B, and a pressing portion 41 for preventing the bus bar 20 or the second voltage detection terminal 30B from detaching upward. The bus bars 20 and the second voltage detection terminals 30B are pressed downward of the pressing portions 41 and accommodated in the bus bar accommodating portions 43 or the detection terminal accommodating portions 44. The support portion is provided at a position where the electrode terminal 11 or the terminal 15 for voltage detection can be avoided when the battery wiring module 10 is attached to the electric cell group 13. Note that the first voltage detection terminals 30A are accommodated in the bus bar accommodating portions 43 in a state where a corner of each terminal body portion 32 is stopped at the circumferential wall 45 in an engaged state.

Among the bus bar accommodating portions 43, first bus bar accommodating portions 46 for accommodating the first bus bars 21 include outer first bus bar accommodating portions 46A provided along the two (the two short edges) extending in the vertical direction of the resin protector 40, and inner first bus bar accommodating portions 46B provided on the inside (center side) of the protector body portion 42 at a predetermined distance from the outer first bus bar accommodating portions 46A, as shown in FIG. 1.

The detection terminal accommodating portions 44 are arranged at regular intervals in the vertical direction between the outer first bus bar accommodating portions 46A.

Among the bus bar accommodating portions 43, second bus bar accommodating portions 47 for accommodating the second bus bars 22 are provided along the two edges (the two longitudinal edges) extending in the horizontal direction of the resin protector 40.

Among the bus bar accommodating portions 43, output bus bar accommodating portions 48 for accommodating the output bus bars 23 are provided at one end on the output terminal 11A side in the horizontal direction of the resin protector 40. The output bus bar accommodating portions 48 include a first output bus bar accommodating portion 48A for accommodating the first output bus bar 23A and a second output bus bar accommodating portion 48B for accommodating the second output bus bar 23B.

The output bus bar accommodating portions 48 extend in the horizontal direction of the resin protector 40, are then shaped so as to be bent substantially L-shaped toward the middle in the vertical direction, and each have, at an end, an external terminal accommodating portion 49 for accommodating the external connection terminal 26. The first output bus bar accommodating portion 48A is provided at a position outward of the second output bus bar accommodating portion 48B.

The resin protector 40 is provided with a wire accommodating groove 52 in which the voltage detection wires 33 connected to the voltage detection terminals 30 are accommodated, so as to linearly extend in the horizontal direction. The wire accommodating groove 52 has a pair of groove wall portions 53, and the voltage detection wires 33 are accommodated therebetween. The wire accommodating groove 52 is provided at a position toward one end in the vertical direction of the resin protector 40. The wire accommodating groove 52 extends along the circumferential wall of the second bus bar accommodating portion 47, one end in the extending direction of the wire accommodating groove 52 passes through between the inner first bus bar accommodating portion 46B and the second bus bar accommodating portion 47, and the other end passes through between the first output bus bar accommodating portion 48A and the second output bus bar accommodating portion 48B. The voltage detection wires 33 withdrawn from the bus bar accommodating portions 43 and the detection terminal accommodating portions 44 are guided by the wire accommodating groove 52 and collectively routed. The ends of the voltage detection wires 33 are connected to an ECU (not shown) or the like, and the voltage of each electric cell 12 is thereby measured.

The resin protector 40 includes the stacking arrangement portion 60 for arranging the voltage detection wires 33 in a stacked manner on the upper side of the bus bars 20. The stacking arrangement portion 60 has a lid portion 61 made of an insulating material for covering the bus bars 20, and a wire covering portion 62 for covering the voltage detection wires 33 arranged on the upper face of the lid portion 61.

Figure 4:
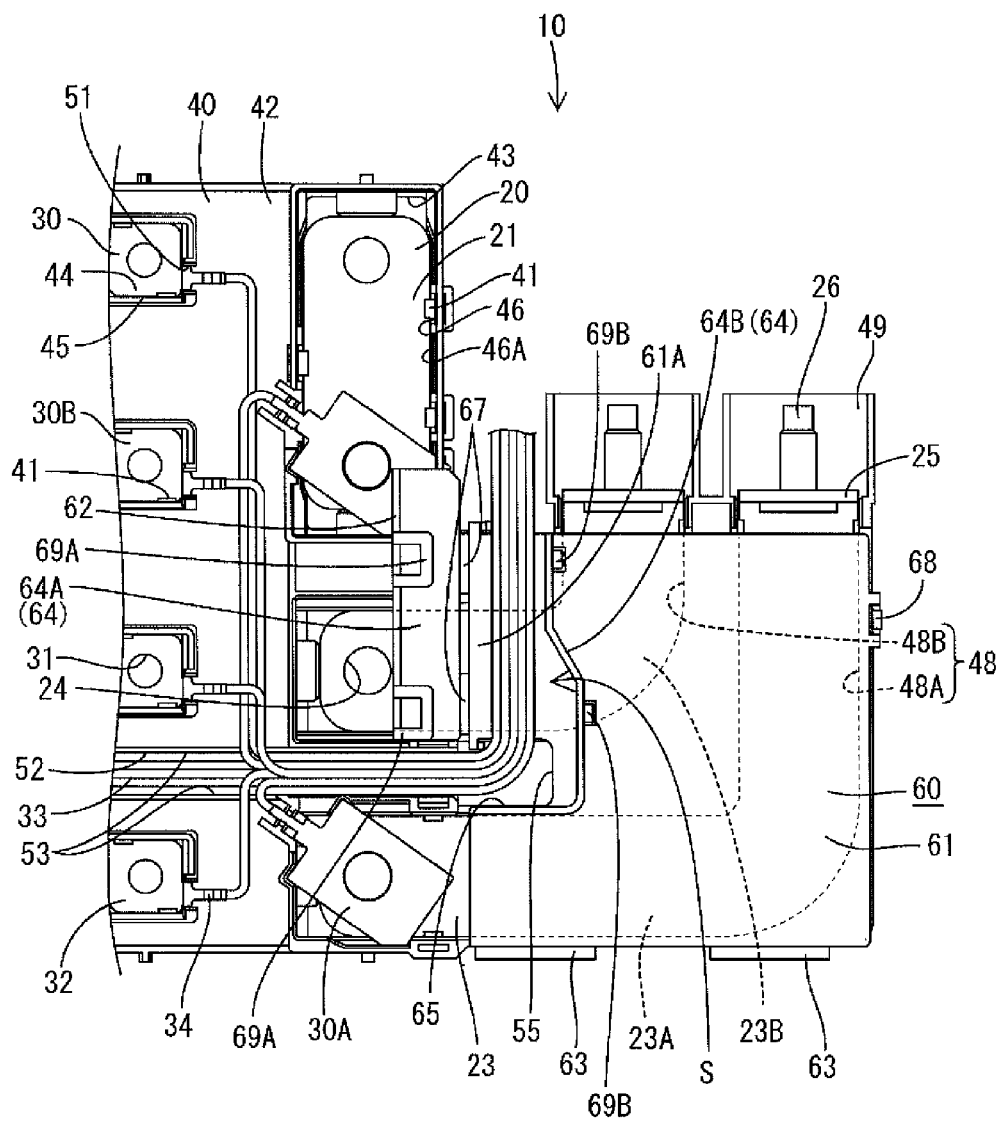
FIG. 4 is a partial enlarged plan view of the battery wiring module showing an opened state of a wire covering portion.

The lid portion 61 has a substantially rectangular plate shape that covers the substantially entire upper face side (opening side) (the substantially entire upper face side, excluding the upper part of the output terminals 11A) of the output bus bar accommodating portions 48 (see FIG. 4). Note that the upper part of the output terminals 11A is covered with a body cover portion 54 for covering the upper face side of the protector body portion 42 (see FIG. 11).

The stacking arrangement portion 60 is integrally coupled to the protector body portion 42 via first hinge portions 63, which are flexible (see FIG. 1). The first hinge portions 63 couple an external wall extending in the horizontal direction, which is part of the circumferential wall 45 of the first output bus bar accommodating portion 48A, to the outer edge of the lid portion 61. A pair of first hinge portions 63 are provided at both ends of the outer edge of the lid portion 61.

The stacking arrangement portion 60 is pivotable between a blocking state (see FIGS. 4 to 6) in which the lid portion 61 abuts the circumferential wall 45 of the output bus bar accommodating portions 48 and blocks the output bus bar accommodating portions 48 and a releasing state (see FIGS. 1 to 3) in which the lid portion 61 is detached from the circumferential wall 45 of the output bus bar accommodating portions 48 and releases the output bus bar accommodating portion 48.

Figure 10:
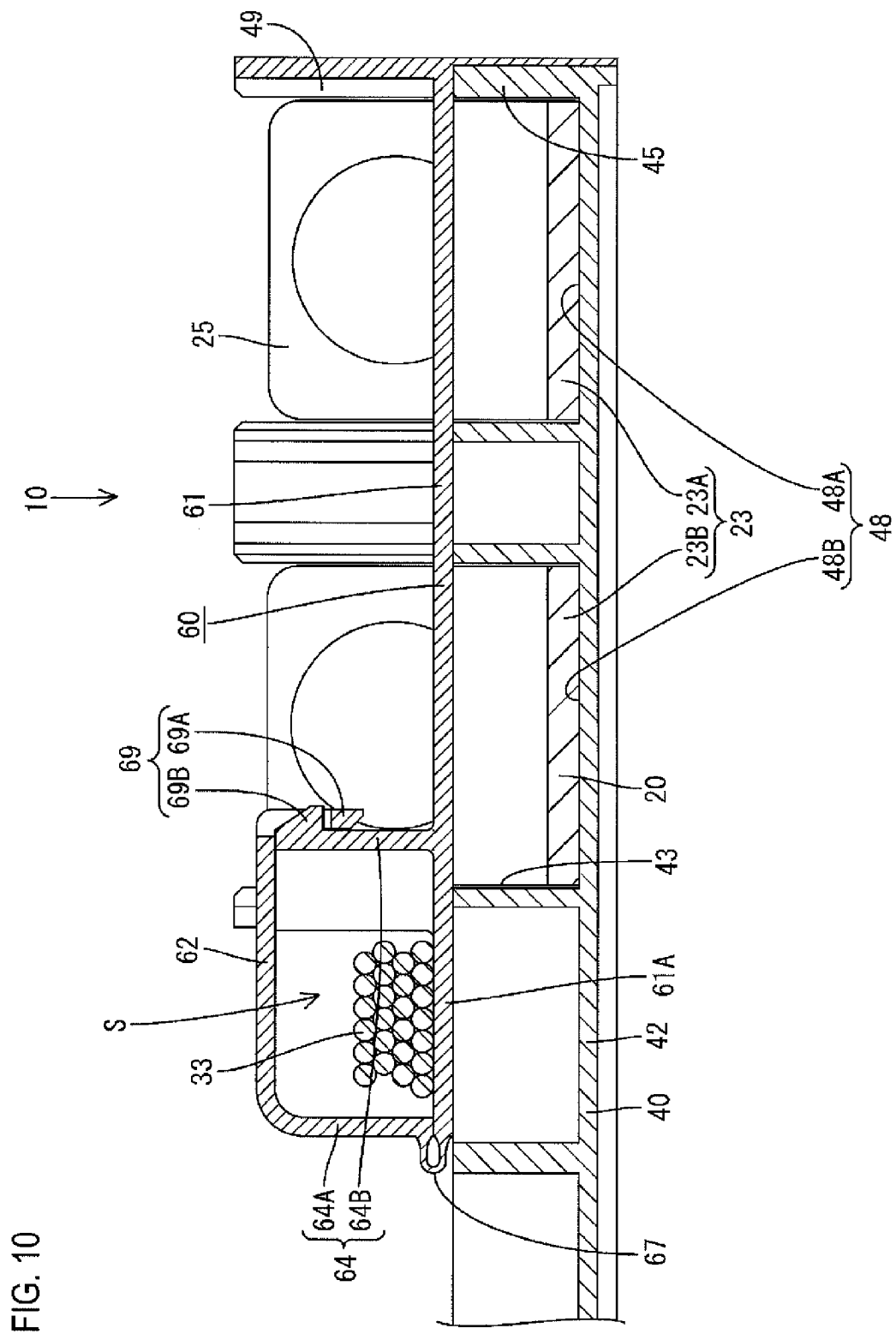
FIG. 10 is a cross-sectional view showing the closed state of the wire covering portion, and is a cross-sectional view corresponding to a cross-section taken at position A-A in FIG. 7.
Figure 11:
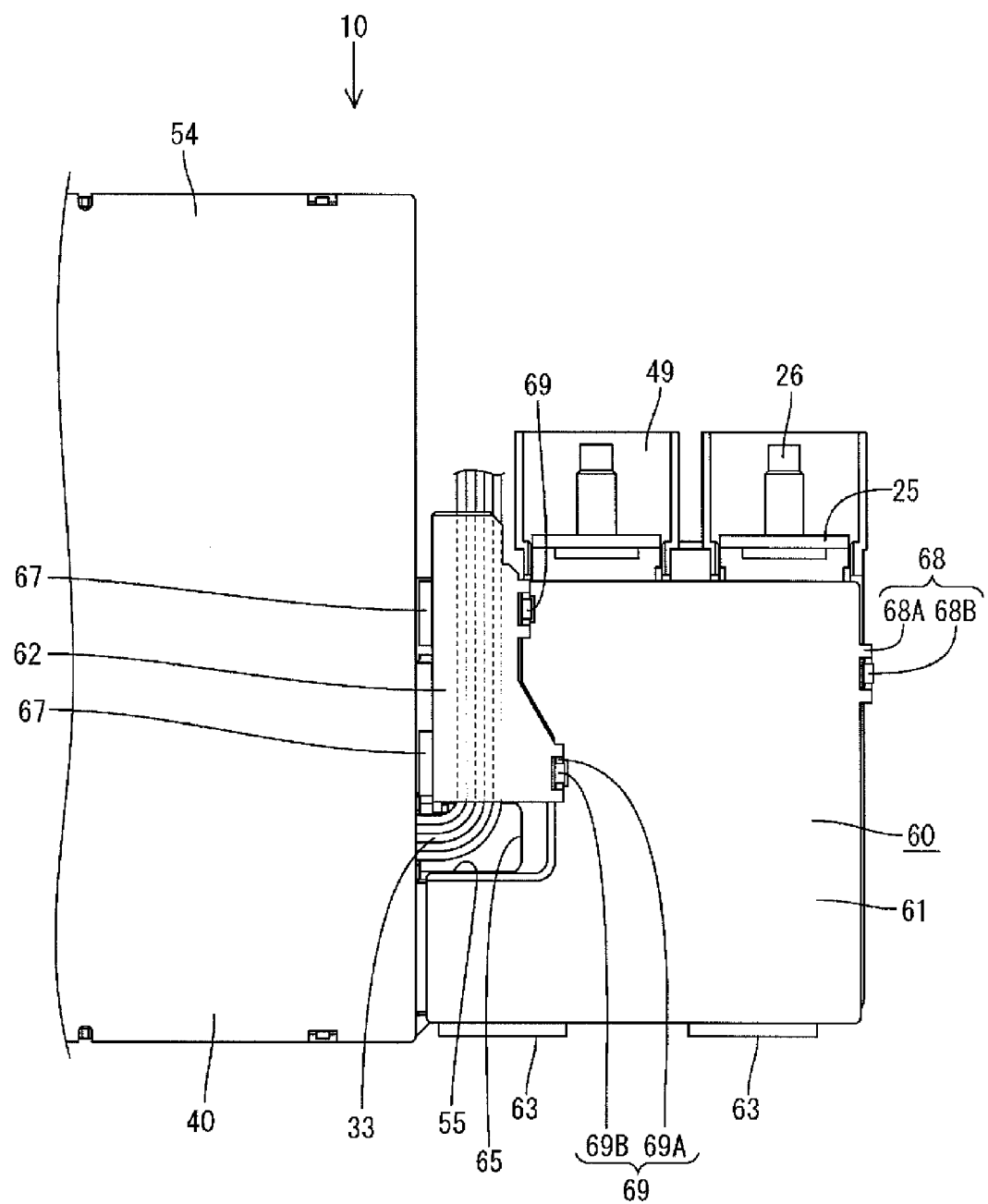
FIG. 11 is a partial enlarged plan view of the battery wiring module showing a state where a body cover portion is installed.

The stacking arrangement portion 60 is provided with a pair of wall portions 64 that stand on both sides of the voltage detection wires 33 on a face of the lid portion 61 opposite to the output bus bars 23, and a space between these wall portions 64 is used as a routing space S through which the voltage detection wires 33 are passed (see FIG. 10). The pair of wall portions 64 are disposed in a direction intersecting a plate face of the lid portion 61. In the present embodiment, the pair of wall portions 64 stand up substantially vertically relative to the plate face of the lid portion 61, and the standing dimension (height dimension) thereof is larger than or equal to the height dimension of the circumferential walls 45 of the bus bar accommodating portions 43.

As shown in FIG. 4, the pair of wall portions 64 are provided continuously from the wire accommodating groove 52 toward the lid portion 61 side. The pair of wall portions 64 extend in a direction in which the wires led out from the wire accommodating groove 52 are bent in a substantially right-angle direction to be routed, and are continuous in the routing direction of the voltage detection wires 33. In other words, the pair of wall portions 64 are formed so as to extend along the routing direction of the voltage detection wires 33. One wall portion (which will be referred to as an "outer wall portion 64A") of the pair of wall portions 64 is provided along the outer edge of the lid portion 61. The outer wall portion 64A extends linearly in the right-angle direction relative to the wire accommodating groove 52. The other wall portion (which will be referred to as an "inner wall portion 64B") of the pair of wall portions 64 extends in the same direction as that of the wire accommodating groove 52, and thereafter extends so as to be bent in the same direction as the extending direction of the outer wall portion 64A. Most of the inner wall portion 64B is substantially parallel to the outer wall portion 64A, and an intermediate part of the inner wall portion 64B is inclined in a direction in which the inner wall portion 64B approaches the outer wall portion 64A. Thus, the routing space S for the voltage detection wires 33 is wider in its width on the side on which the routing space S is continuous with the wire accommodating groove 52, and is narrower in its width on the opposite side (exit side). A recess portion 65, which is a recess of a substantially rectangular shape formed at part of the outer edge of the lid portion 61, is provided at a position of the lid portion 61 corresponding to the bent portion of the voltage detection wires 33.

Figure 7:
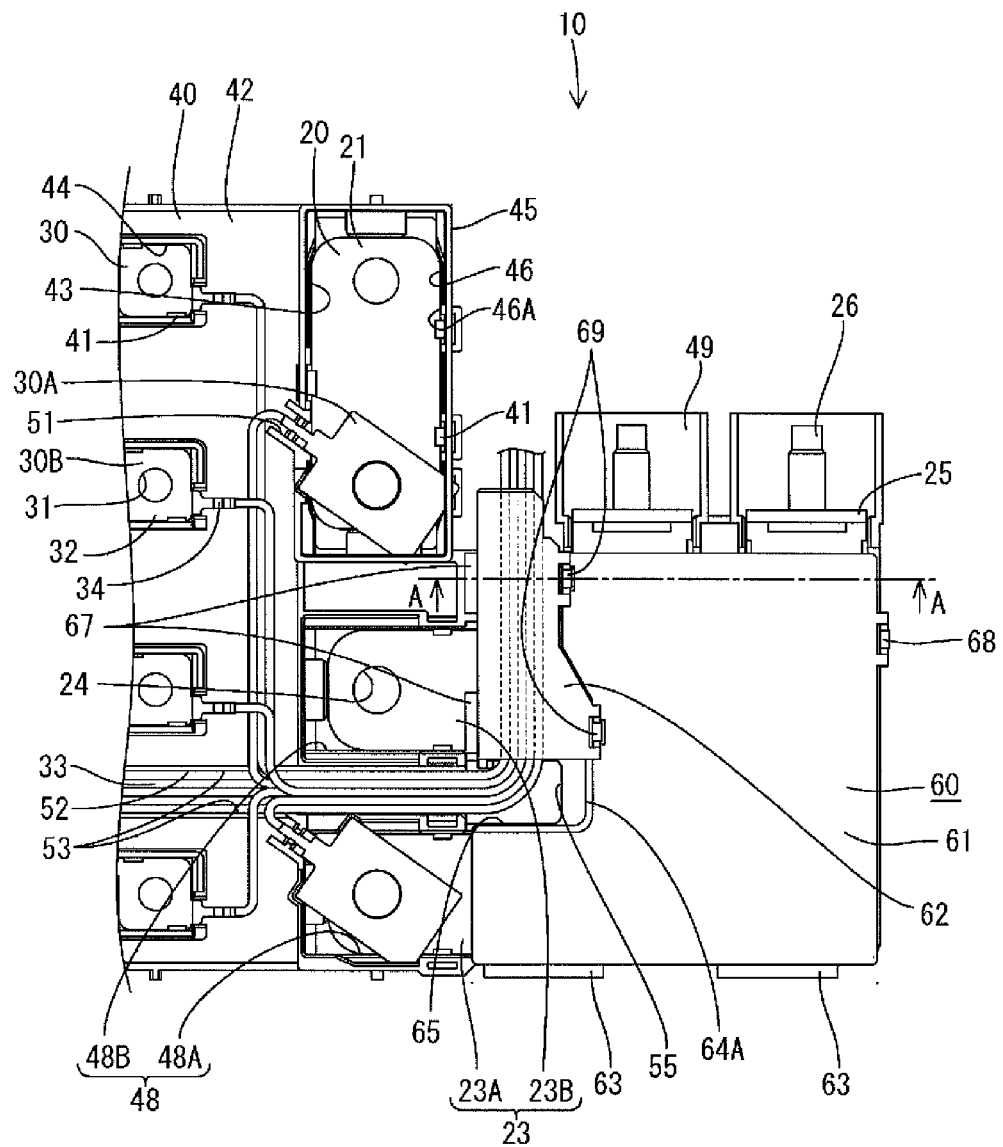
FIG. 7 is a partial enlarged plan view of the battery wiring module showing a closed state of the wire covering portion.
Figure 8:
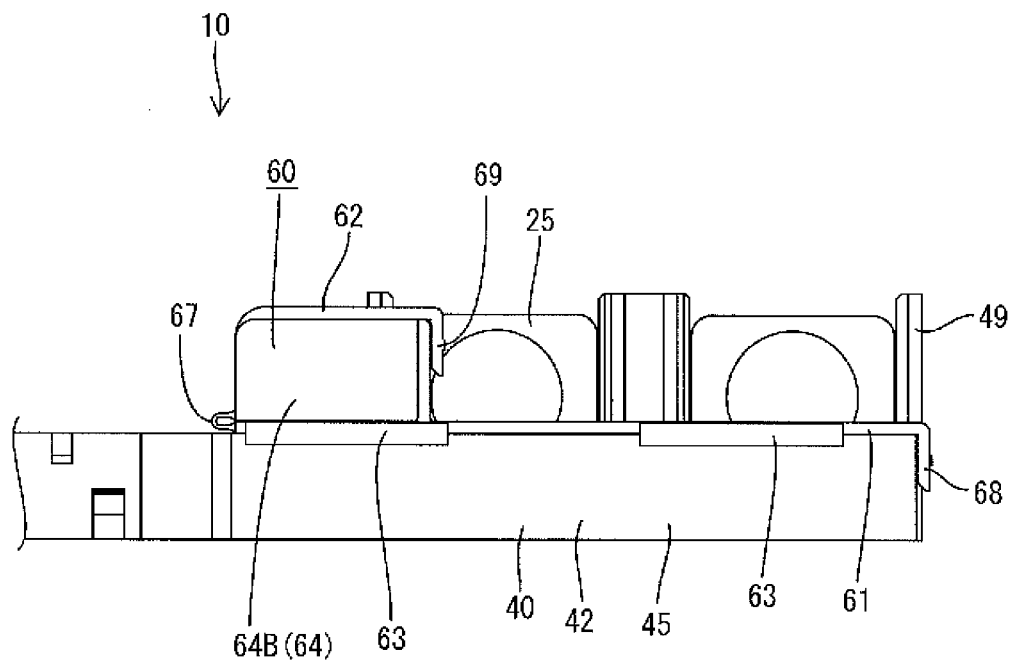
FIG. 8 is a partial enlarged front view of the battery wiring module showing the closed state of the wire covering portion.
Figure 9:
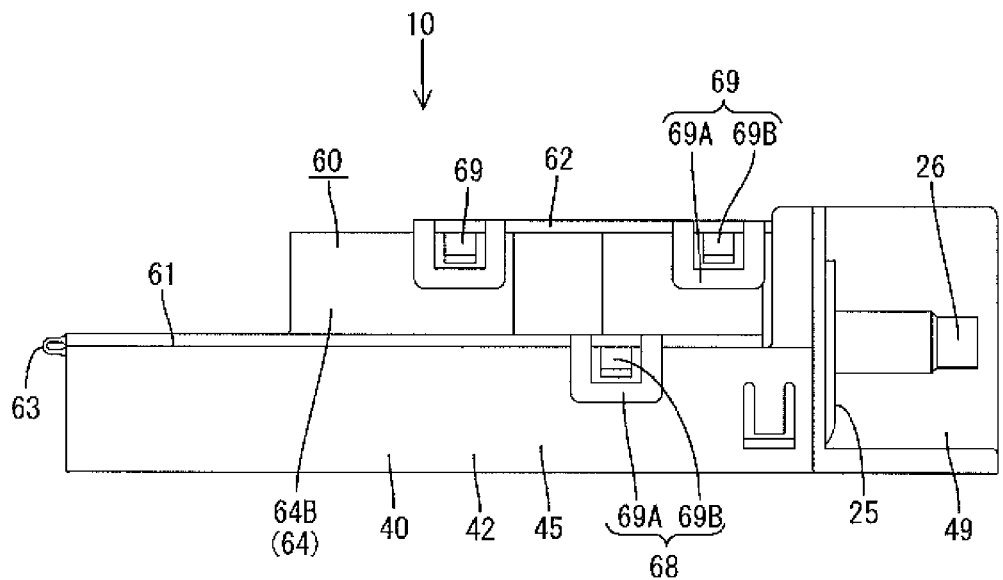
FIG. 9 is a partial enlarged side view of the battery wiring module showing the closed state of the wire covering portion.

The stacking arrangement portion 60 is provided with a wire covering portion 62 for covering the voltage detection wires 33 routed in the routing space S, the wire covering portion bridging the pair of wall portions 64. The outer wall portion 64A of the pair of wall portions 64 is integrated with the wire covering portion 62, and the wire covering portion 62 and the outer wall portion 64A form a substantially right angle. As shown in FIG. 7, the entire wire covering portion 62 forms a plate shape elongated in the extending direction of the voltage detection wires 33, and its edge on the side where it abuts the inner wall portion 64B is formed in a step-like shape extending along the inner wall portion 64B. The inner wall portion 64B is integrated with the lid portion 61.

One edge in the longitudinal direction of the wire covering portion 62 is located above the circumferential wall 45 of the second output bus bar accommodating portion 48B, and the other edge protrudes outward of the lid portion 61. The wire covering portion 62 covers the substantially entire routing space S excluding the end thereof on the side where it is continuous with the wire accommodating groove 52, that is to say, the substantially entire voltage detection wires 33 excluding a bent portion thereof arranged above the lid portion 61. An end of the wire covering portion 62 on the side where it protrudes from the lid portion 61 toward the outside is provided with a wire pressing piece 66 for pressing the voltage detection wires 33 (see FIGS. 2 and 5).

The wire covering portion 62 is integrally coupled with the lid portion 61 via second hinge portions 67, which are flexible. The wire covering portion 62 is provided pivotably between a closed state where it closes the routing space S (see FIGS. 7 to 10) and an opened state (see FIGS. 4 to 6) where it releases the routing space S. The second hinge portions 67 couple the outer wall portion 64A integrated with the wire covering portion 62 to the outer edge of the lid portion 61 (see FIG. 5). A portion (which will be referred to as a "coupling portion 61A") of the lid portion 61 in which the second hinge portions 67 are provided is located on the side opposite to the first hinge portions 63 with respect to the recess portion 65 (see FIG. 1). A pair of second hinge portions 67 are provided on the coupling portion 61A. The coupling portion 61A constitutes a bottom wall of the routing space S.

The stacking arrangement portion 60 and the protector body portion 42 are provided with first locking structures 68 for stopping each other in an engaged state with pivoting movement of the lid portion 61 from the releasing state to the blocking state. The first locking structures 68 are provided at several portions (in the present embodiment, three portions) and configured to include first locking pieces 68A provided on the lid portion 61 and first locking projections 68B provided on the protector body portion 42.

The first locking pieces 68A each have an opening to which the first locking projection 68B is fitted, extend substantially vertically from the lid portion 61 toward the side of one face (the output bus bar 23 side in the blocking state), and are able to elastically deform in the plate face direction of the lid portion 61. The first locking pieces 68A are provided respectively on the both sides of the coupling portion 61A and the side opposite to the coupling portion 61A. One of the first locking pieces 68A on the both sides of the coupling portion 61A is provided at the recess portion 65.

The first locking projections 68B are provided at positions corresponding to the first locking pieces 68A on the protector body portion 42. Among the first locking projections 68B, the first locking projection 68B corresponding to the first locking piece 68A provided at the recess portion 65 is provided so as to protrude toward an opening portion 55 provided between the first output bus bar accommodating portion 48A and the second output bus bar accommodating portion 48B.

The wire covering portion 62 and the lid portion 61 are provided with second locking structures 69 for stopping each other in an engaged state with pivoting movement of the wire covering portion 62 from the opened state to the closed state. The second locking structures 69 are provided at several portions (in the present embodiment, two portions), and are configured to include second locking pieces 69A provided on the wire covering portion 62 and second locking projections 69B provided on the lid portion 61.

The second locking pieces 69A each have an opening to which the second locking projection 69B is fitted, extend substantially vertically from the wire covering portion 62 toward the side of one face (the lid portion 61 side in the closed state), and are able to elastically deform in the plate face direction of the wire covering portion 62. The second locking pieces 69A are provided respectively at a wide-width portion and a narrow-width portion of the wire covering portion 62.

The second locking projections 69B are provided at the positions corresponding to the second locking pieces 69A at the inner wall portion 64B integrated with the lid portion 61. The second locking projections 69B are provided so as to protrude toward the outer face of the inner wall portion 64B.

A description is provided below directed to arranging the voltage detection wires 33 in a stacked manner on the upper side of the bus bars 20. First, the lid portion 61 is stacked on, and fixed to, the upper side of the output bus bars 23. The output bus bars 23 are accommodated in the output bus bar accommodating portions 48 with the lid portion 61 being in the releasing state (see FIG. 1), and thereafter, the lid portion 61 is pivoted in the direction of an arrow in FIG. 3 into the blocking state. At this time, the first locking pieces 68A go over the first locking projections 68B with the pivoting of the lid portion 61, the lid portion 61 assumes the blocking state while the first locking pieces 68A go beyond the first locking projections 68B and elastically recover, and the first locking structures 68 assume a locked state (see FIG. 6).

Next, the voltage detection wires 33 are routed on the upper face of the lid portion 61. The wire covering portion 62 is brought into the opened state, and a bundle of the voltage detection wires 33 led out from the wire accommodating groove 52 is bent at a right angle and arranged in the routing space S of the lid portion 61 (see FIG. 4). Then, the voltage detection wires 33 are pressed toward the inner wall portion 64B by their own elastic restoring force, and disposed and positioned along the inner wall portion 64B. Thus, the voltage detection wires 33 extend across the second output bus bar 23B in the width direction and are arranged thereabove in a stacked manner.

Figure 5:
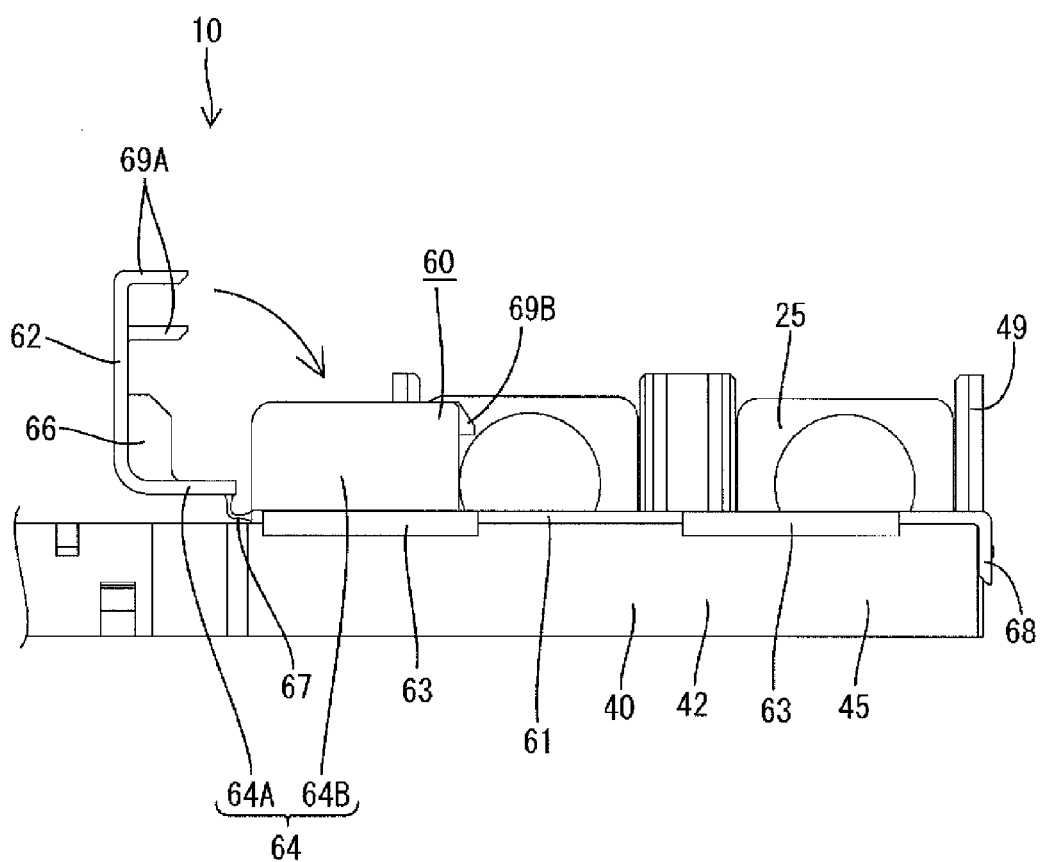
FIG. 5 is a partial enlarged front view of the battery wiring module showing the opened state of the wire covering portion.
Figure 6:
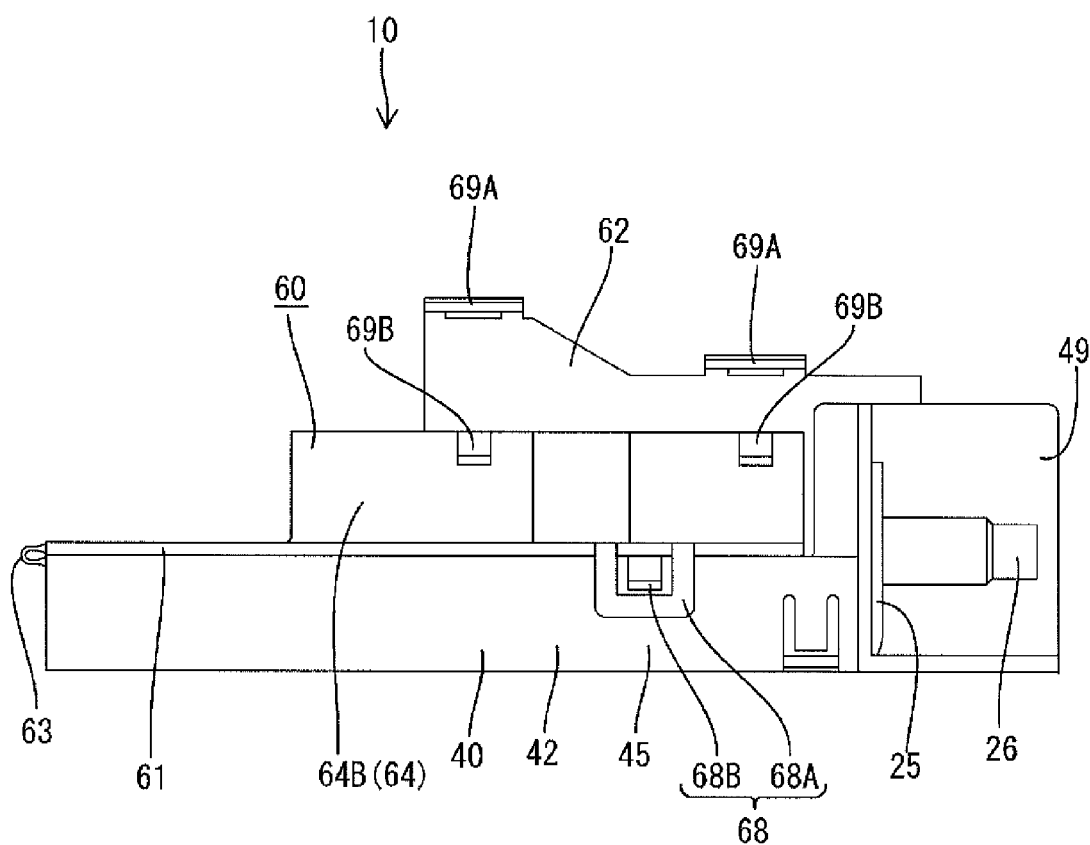
FIG. 6 is a partial enlarged side view of the battery wiring module showing the opened state of the wire covering portion.

Next, the wire covering portion 62 is pivoted in the direction of an arrow in FIG. 5 and brought into the closed state. At this time, the second locking pieces 69A go over the second locking projections 69B with the pivoting of the wire covering portion 62, the wire covering portion 62 assumes the closed state while the second locking pieces 69A go beyond the second locking projections 69B and elastically recover, and the second locking structures 69 assume a locked state (see FIG. 9). Thus, the voltage detection wires 33 are arranged in a stacked manner on the upper side of the output bus bars 23 and fixed.

The battery wiring module 10 in the present embodiment that is thus assembled is attached to the upper face of the electric cell group 13 whose electrode terminals 11 are directed upward. In other words, the battery wiring module 10 is placed on the upper side of the electric cell group 13, the shaft portions of the bolts are passed through the through holes 24 of the bus bars 20 and the through holes 31 of the voltage detection terminals 30 and are screwed into the respective internal screw holes 16, thereby connecting the adjoining positive and negative electrode terminals 11 to each other and connecting the voltage detection terminals 30 to predetermined electrode terminals 11 and terminals 15 for voltage detection, and a battery module is finished.

The present embodiment configured as described above achieves the following effect. The battery wiring module 10 in the present embodiment is attached to the electric cell group 13 constituted by an array of the plurality of electric cells 12 each having the positive and negative electrode terminals 11, and has the bus bars 20 to be connected to the electrode terminals 11, the voltage detection wires 33 for detecting a state of the electric cell group 13, and the resin protector 40 for holding the bus bars 20. The resin protector 40 is provided with the lid portion 61 made of an insulating material for covering the output bus bars 23, and the pair of wall portions 64 standing on both sides of the voltage detection wires 33 on a face of the lid portion 61 opposite to the output bus bars 23, and a space between the pair of wall portions 64 is used as the routing space S through which the voltage detection wires 33 are passed.

With this configuration, the voltage detection wires 33 can be collectively positioned at the lid portion 61 without attaching a fixing member to the voltage detection wires 33, for example. Accordingly, the voltage detection wires 33 can be routed in a superposed manner on the side of one face of the output bus bars 23, without degrading workability in an assembly work.

The pair of wall portions 64 extend continuously in the routing direction of the voltage detection wires 33, and the wire covering portion 62 for covering the voltage detection wires 33 routed in the routing space S is provided so as to bridge the pair of wall portions 64. With this configuration, it is possible to restrict protrusion of the voltage detection wires 33 from the routing space S to the outside, and prevent the voltage detection wires 33 from coming in contact with the outside.

The wire covering portion 62 is integrated with the lid portion 61 and is pivotable between the closed stated in which the wire covering portion 62 closes the routing space S and the opened state in which it releases the routing space S. With this configuration, it is possible to fix the voltage detection wires 33 to the lid portion 61 and protect the voltage detection wires 33 with an easy operation of only routing the voltage detection wires 33 in the routing space S with the wire covering portion 62 being in the opened state and then pivoting the wire covering portion 62 into the closed state.

The lid portion 61 and the wire covering portion 62 are provided with the second locking structures 69 for stopping each other in an engaged state with pivoting movement of the wire covering portion 62 from the opened state to the closed state. With this configuration, the wire covering portion 62 and the lid portion 61 can be locked with an easy operation of only pivoting the wire covering portion 62 from the opened state to the closed state.

Other Embodiments

The present invention is not limited to the embodiment described in the above description and the drawings, and numerous other embodiments are also embraced in the technical scope of the present invention. A few such embodiments are provided below for exemplary purposes only.

(1) In the above embodiment, the electrode terminals 11 and the terminals 15 for voltage detection each have the internal screw hole 16, and the bus bars 20 and the voltage detection terminals 30 are pressed and fixed to the electrode terminals 11 or the terminals 15 for voltage detection using the bolts that are paired with the internal screw holes 16. However, the present invention is not limited thereto and, for example, the electrode terminals and the voltage detection terminals may be formed in a bolt shape, and the bus bars and the voltage detection terminals may be pressed and fixed thereto using nuts that are paired with the electrode terminals or the terminals for voltage detection.

(2) Although the electric cells 12 are rectangular cells each with the body portion 14 having a flat and rectangular box shape in the above embodiment, the present invention is applicable to electric cells having any kind of shape. For example, the present invention is also applicable to cylindrical electric cells each having a cylindrical body portion.

(3) Although the resin protector 40 includes the plurality of coupling units in the above embodiment, the present invention is not limited thereto. For example, the resin protector may be a single resin plate capable of holding all bus bars.

(4) Although the above embodiment described an example of the present invention applied to the case where the voltage detection wires 33 are arranged in a stacked manner on the output bus bars 23 arranged at an end of the resin protector 40, the present invention is not limited thereto. The present invention is also applicable to the case where detection wires such as the voltage detection wires are arranged in a stacked manner on bus bars arranged at the center of the resin protector, for example.

(5) Although the inner wall portion 64B is integrated with the lid portion 61 in the above embodiment, the present invention is not limited thereto. For example, the inner wall portion may be integrated with the protector body portion, the lid portion may be provided with a through hole through which this inner wall portion is caused to protrude toward the opposite side, and the inner wall portion may be caused to protrude toward the voltage detection wire side from this through hole.

(6) Although the inner wall portion 64B of the pair of wall portions 64 is integrated with the lid portion 61, and the outer wall portion 64A is integrated with the wire covering portion 62 in the above embodiment, the present invention is not limited thereto. Both wall portions may be integrated with the lid portion.

(7) Although the pair of wall portions 64 are installed in a standing manner on both sides of the voltage detection wires 33 in the above embodiment, the present invention is not limited thereto. For example, the wall portion (inner wall portion) may be provided only on the side against which the voltage detection wires are pressed by its own elastic restoring force.

(8) Although the stacking arrangement portion 60 is coupled to the protector body portion 42 with the first hinge portions 63 in the above embodiment, the present invention is not limited thereto. The stacking arrangement portion may be a separate body that is not coupled to the protector body portion, and may be separately coupled to the protector body portion with a coupling means when necessary.

(9) Although the wire covering portion 62 covers the substantially entire routing space S in the above embodiment, the present invention is not limited thereto. For example, the wire covering portion may be provided so as to cover only part of the routing space, and such wire covering portions may be provided at multiple portions.

(10) Although the wall portion 64 extends continuously along the voltage detection wires 33 in the above embodiment, the present invention is not limited thereto. For example, the wall portion may be divided into multiple portions on the side of the voltage detection wires.

The invention claimed is:

1. A battery wiring module for attachment to an electric cell group that includes an array of a plurality of electric cells, each having positive and negative electrode terminals, the battery wiring module comprising:
    a bus bar to be connected to the electrode terminals;
    a detection wire configured to detect a state of the electric cell group;
    a resin protector that holds the bus bar;
    a lid portion that covers the bus bar and is formed of an insulating material, the lid portion defining a face that is opposite to the bus bar in a direction intersecting the lid portion; and
    at least one wall portion disposed on the face of the lid portion, the at least one wall portion defining a routing space in which the detection wire is routed.

2. The battery wiring module according to claim 1,
    wherein the at least one wall portion is a pair of wall portions provided on both sides of the detection wire, and the pair of wall portions extend continuously in a routing direction of the detection wire,
    further comprising a wire covering portion for covering the detection wire that is routed in the routing space so as to bridge the pair of wall portions.

3. The battery wire module according to claim 2, wherein the pair of wall portions and wire covering portion are configured to restrict protrusion of the detection wire from the routing space to the exterior.

4. The battery wiring module according to claim 2,
    wherein the wire covering portion is integrated with the lid portion, and is pivotable between a closed state in which the wire covering portion closes the routing space, and an opened state in which the wire covering portion releases the routing space.

5. The battery wiring module according to claim 4,
    wherein the wire covering portion and the wall portion are each provided with a locking structure for stopping each other in an engaged manner with pivoting movement of the wire covering portion from the opened state to the closed state.

6. The battery wiring module according to claim 4, wherein the wire covering portion and the lid portion are configured to fix the detection wire to the lid portion.

* * * * *